(12) United States Patent
Yao

(10) Patent No.: US 9,218,259 B2
(45) Date of Patent: Dec. 22, 2015

(54) COMPUTING DEVICE AND METHOD FOR TESTING SOL FUNCTION OF A MOTHERBOARD OF THE COMPUTING DEVICE

(71) Applicants: HONG FU JIN PRECISION INDUSTRY (ShenZhen) CO., LTD., Shenzhen (CN); HON HAI PRECISION INDUSTRY CO., LTD., New Taipei (TW)

(72) Inventor: Ling Yao, Shenzhen (CN)

(73) Assignees: HONG FU JIN PRECISION INDUSTRY (ShenZhen) CO., LTD., ShenZhen (CN); HON HAI PRECISION INDUSTRY CO., LTD., New Taipei (TW)

( * ) Notice: Subject to any disclaimer, the term of this patent is extended or adjusted under 35 U.S.C. 154(b) by 596 days.

(21) Appl. No.: 13/684,620

(22) Filed: Nov. 26, 2012

(65) Prior Publication Data

US 2013/0159588 A1    Jun. 20, 2013

(51) Int. Cl.
*G06F 11/00* (2006.01)
*G06F 11/22* (2006.01)
*G06F 11/27* (2006.01)

(52) U.S. Cl.
CPC .......... *G06F 11/221* (2013.01); *G06F 11/2221* (2013.01); *G06F 11/27* (2013.01)

(58) Field of Classification Search
CPC .... G06F 11/221; G06F 11/2221; G06F 11/27
See application file for complete search history.

(56) References Cited

U.S. PATENT DOCUMENTS

| 7,760,769 | B1 * | 7/2010 | Lovett et al. | 370/542 |
| 2007/0055793 | A1 * | 3/2007 | Huang et al. | 710/8 |
| 2013/0262642 | A1 * | 10/2013 | Kutch | 709/223 |

* cited by examiner

*Primary Examiner* — Joseph Kudirka
(74) *Attorney, Agent, or Firm* — Novak Druce Connolly Bove + Quigg LLP

(57) ABSTRACT

A method for testing a serial over local area network (SOL) function of a motherboard of a computing device. The method determines that the SOL function is normal if forward data can be transmitted from the serial port of the motherboard to a network interface controller (NIC) of the motherboard through a predefined path, and backward data can be transmitted from the NIC to the serial port through a predefined reverse path. The method determines that the SOL function is abnormal if the forward data cannot be transmitted from the serial port to the NIC through the predefined path, or the backward data cannot be transmitted from the NIC to the serial port through the predefined reverse path.

18 Claims, 3 Drawing Sheets

COMPUTING DEVICE AND METHOD FOR TESTING SOL FUNCTION OF A MOTHERBOARD OF THE COMPUTING DEVICE

BACKGROUND

1. Technical Field

Embodiments of the present disclosure relate to motherboard testing systems and methods, and particularly to a computing device and method for testing a serial over local area network (SOL) function of a motherboard of the computing device.

2. Description of Related Art

Serial over local area network (SOL) function of a motherboard is used to configure and monitor transferring process of a serial port of a computing device. The SOL function is tested by a user manually in a development stage of the motherboard. However, there is no standard method to test the SOL function in a production stage of the motherboard. The traditional testing of the SOL function is not convenient or efficient, and may impact the quality and production efficiency of the motherboard. Therefore, a more convenient and efficient method for testing the SOL function in the development and production stages is desired.

DETAILED DESCRIPTION

The disclosure is illustrated by way of example and not by way of limitation in the figures of the accompanying drawings in which like references indicate similar elements. It should be noted that references to "an" or "one" embodiment in this disclosure are not necessarily to the same embodiment, and such references mean "at least one".

In general, the word module, as used herein, refers to logic embodied in hardware or firmware, or to a collection of software instructions, written in a programming language, such as, Java, C, or assembly. One or more software instructions in the modules may be embedded in firmware, such as in an EPROM. The modules described herein may be implemented as either software and/or hardware modules and may be stored in any type of non-transitory computer-readable medium or other storage system. Some non-limiting examples of non-transitory computer-readable medium include CDs, DVDs, BLU-RAY, flash memory, and hard disk drives.

Figure 1:
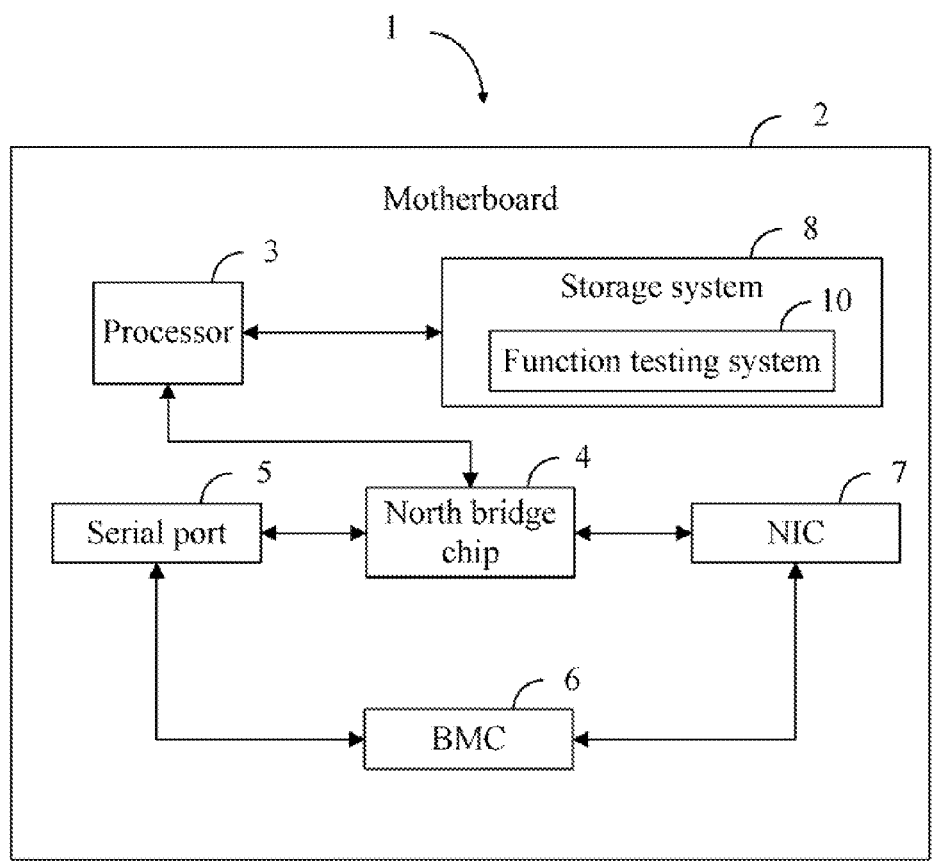
FIG. 1 is a block diagram of one embodiment of a computing device including a function testing system.

FIG. 1 is a block diagram of one embodiment of a computing device 1 including a function testing system 10. In the embodiment, the computing device 1 further includes a motherboard 2. The motherboard 2 includes at least one processor 3, a north bridge chip 4, a serial port 5 (e.g. DB9 serial port), a baseboard management controller (BMC) 6, a network interface controller (NIC) 7, and a storage system 8. The at least one processor 3 executes one or more computerized codes and other applications of the computing device 1, to provide functions of the function testing system 10. The function testing system 10 may test a serial over local area network (SOL) function of the motherboard 2.

The function testing system 10 is stored in the storage system 8. The storage system 8 further stores a plurality of forward data and backward data, where the forward data and backward data may be in the form of packets or in a stream. The forward data is data that is used to transmit from the serial port 5 to the NIC 7, and the backward data is data that is used to transmit from the NIC 7 to the serial port 5. The storage system 8 may be an internal storage system, such as a random access memory (RAM) for temporary storage of information, and/or a read only memory (ROM) for permanent storage of information. In some embodiments, the storage system 8 may also be an external storage system, such as an external hard disk, a storage card, or a data storage medium.

The at least one processor 3 is electronically connected to both of the storage system 8 and the north bridge chip 4. The north bridge chip 4 may be connected to the serial port 5 through a low pin count bus (LPC), and connected to the NIC 7 through a peripheral component interconnection (PCI) bus. The BMC 6 may be electronically connected to the serial port 5, and connected to the NIC 7 through a network controller sideband interface (NC-SI) bus.

Figure 2:
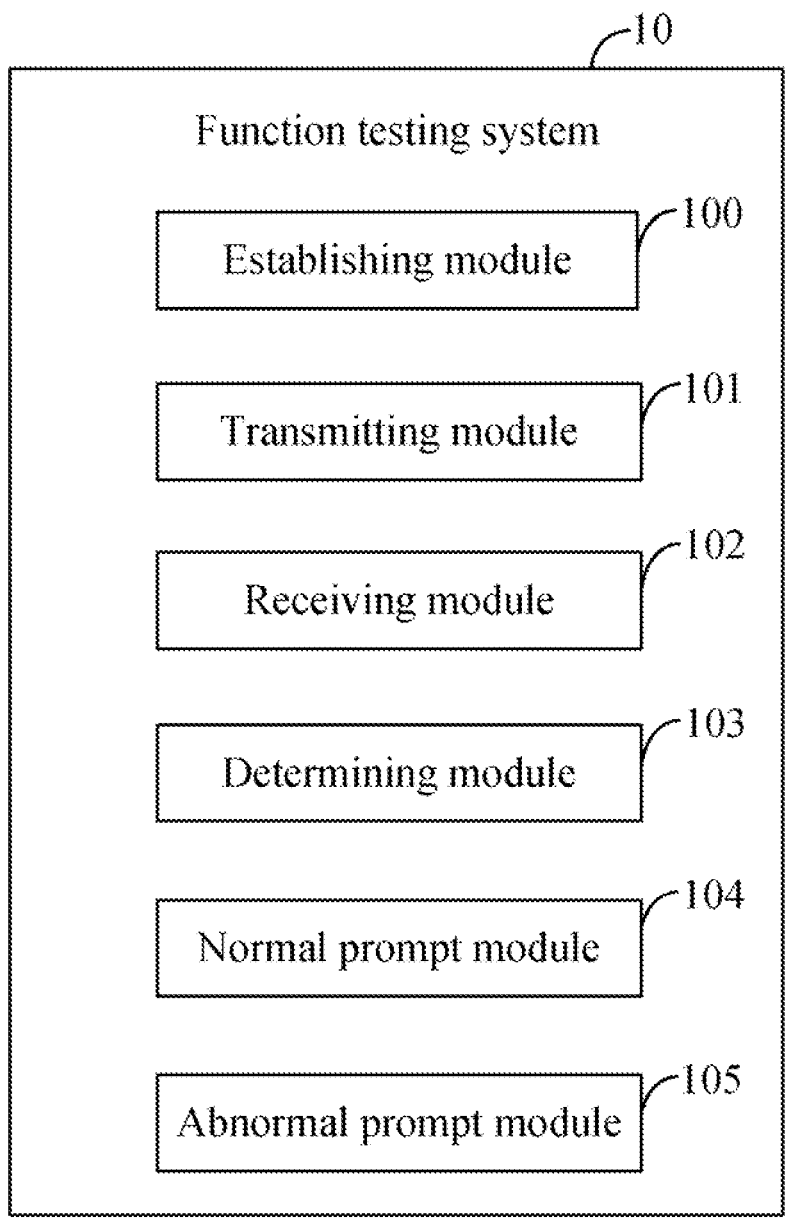
FIG. 2 is a block diagram of function modules of the function testing system included in the computing device of FIG. 1.

FIG. 2 is a block diagram of function modules of the function testing system 10 included in the computing device 1 of FIG. 1. In one embodiment, the function testing system 10 may include one or more modules, for example, an establishing module 100, a transmitting module 101, a receiving module 102, a determining module 103, a normal prompt module 104 and an abnormal prompt module 105. The one or more modules 100-105 may comprise computerized code in the form of one or more programs that are stored in the storage system 8 of the computing device 1. The computerized code includes instructions that are executed by the at least one processor 3 to provide functions for the one or more modules 100-105. A detailed description of each module will be given in the following paragraphs.

Figure 3:
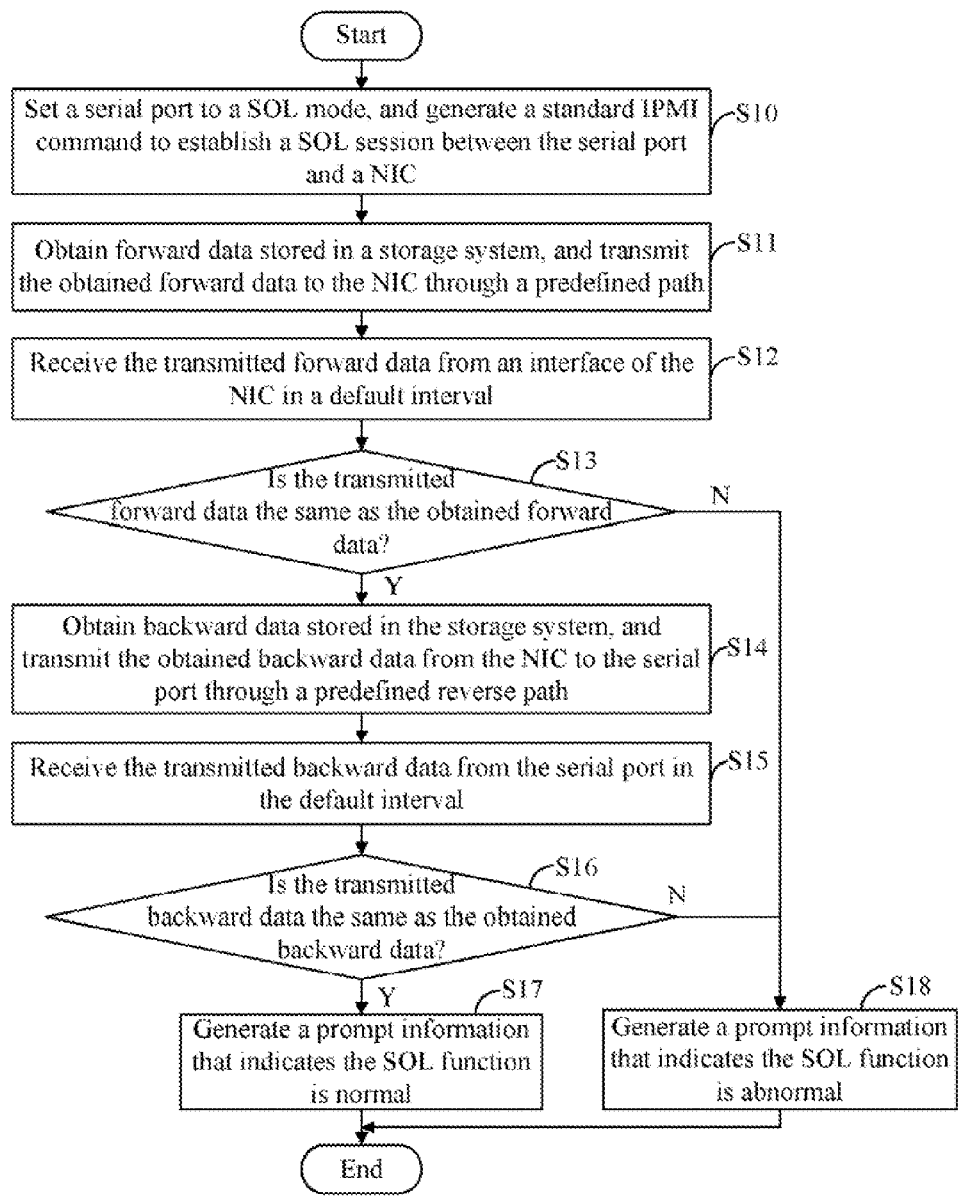
FIG. 3 is a flowchart of one embodiment of a method for automatically testing SOL function of a motherboard of the computing device of FIG. 1.

FIG. 3 is a flowchart of one embodiment of a method for automatically testing SOL function of a motherboard of the computing device 1. Depending on the embodiment, additional steps may be added, others removed, and the ordering of the steps may be changed.

In step S10, the establishing module 100 sets the serial port 5 to a SOL mode, and generates a standard intelligent platform management interface (IPMI) command to establish a SOL session between the serial port 5 and the NIC 7. In one embodiment, the capabilities of the serial port 5 include functioning in a SOL mode, a system mode, and a BMC mode. The computing device 1 may have different functions when the serial port 5 operates in different modes.

In one embodiment, after the SOL session is established, the forward data can be transmitted from the serial port 5 to the NIC 7, and the backward data can be transmitted from the NIC 7 to the serial port 5.

In step S11, the transmitting module 101 obtains an amount or a set of forward data from the storage system 8, and transmits the obtained forward data to the NIC 7 through a predefined path, where the predefined path indicates that the obtained forward data is transmitted from the serial port 5 to the BMC 6 first, and then transmitted from the BMC 6 to the NIC 7.

In one embodiment, the obtained forward data is formatted by the at least one processor 3 into a format suitable for transmission by the serial port 5. For example, the obtained forward data is formatted by the at least one processor 3 to characters. The formatted forward data is transmitted to the north bridge chip 4 and the serial port 5, and then transmitted to the NIC 7 through the predefined path.

In step S12, the receiving module 102 receives the transmitted forward data from an interface of the NIC 7 in a default interval. In one embodiment, the default interval may be user-determined or pre-determined, and is based on the performance of the motherboard 2. For example, the default interval may be 0.1 second or 0.2 seconds.

In one embodiment, if the motherboard 2 is high performance, the obtained forward data transfer rate is high, and the receiving module 102 receives the transmitted forward data within a time which is far shorter than the default interval. If the motherboard 2 is low performance, the obtained forward data transfer rate is low, and the receiving module 102 receives the transmitted forward data within a longer time, which may be equal to the default interval. If the SOL function of the motherboard 2 is abnormal, the receiving module 102 does not receive the transmitted forward data in the default interval, and a null value is returned.

In step S13, the determining module 103 determines whether the transmitted forward data is the same as the obtained forward data. If the transmitted forward data is the same as the obtained forward data, step S14 is implemented. If the transmitted forward data is not the same as the obtained forward data, step S18 is implemented.

In step S14, the transmitting module 101 obtains an amount or a set of backward data from the storage system 8, and transmits the obtained backward data from the NIC 7 to the serial port 5 through a predefined reverse path, where the predefined reverse path indicates that the obtained backward data is transmitted from the NIC 7 to the BMC 6 first, and then transmitted from the BMC 6 to the serial port 5.

In one embodiment, the obtained backward data is formatted by the at least one processor 3 into a format suitable for transmission by the NIC 7. For example, the obtained backward data is formatted by the at least one processor 3 to characters. The formatted backward data is transmitted to the north bridge chip 4 and the NIC 7, and then transmitted to the serial port 5 through the predefined reverse path.

In step S15, the receiving module 102 receives the transmitted backward data from the serial port 5 in the default interval. The receiving module 102 receives the transmitted backward data from the serial port 5 in the same way as that of step S12.

In step S16, the determining module 103 determines whether the transmitted backward data is the same as the obtained backward data. If the transmitted backward data is the same as the obtained backward data, step S17 is implemented. If the transmitted backward data is not the same as the obtained backward data, step S18 is implemented.

In step S17, the normal prompt module 104 generates a prompt information that indicates the SOL function is normal. The prompt information may include the obtained forward data, the transmitted forward data, the time for obtaining the transmitted forward data from the NIC 7, the obtained backward data, the transmitted backward data, and the time for obtaining the transmitted backward data from the serial port 5, for example.

In step S18, the abnormal prompt module 104 generates a prompt information that indicates the SOL function is abnormal.

In the prior art, the SOL function must be tested by a user manually in a development stage of the motherboard 2, and there is no standard method to test the SOL function in a production stage of the motherboard 2. The testing of the SOL function is not convenient or efficient, and may impact the quality and production efficiency of the motherboard 2. In this disclosure, the SOL function can be tested automatically in both the development and production stages. The testing of the SOL function by this disclosure is convenient and efficient, and may enhance the quality and production efficiency of the motherboard 2.

The described embodiments are merely possible examples of implementations, and have been set forth for a clear understanding of the principles of the present disclosure. Many variations and modifications may be made without departing substantially from the spirit and principles of the present disclosure. All such modifications and variations are intended to be included herein within the scope of this disclosure and the described inventive embodiments, and the present disclosure is protected by the following claims.

What is claimed is:

1. A computer-implemented method of a computing device for testing a serial over local area network (SOL) function of a motherboard of the computing device, the method comprising:

setting a serial port of the motherboard to a SOL mode, and generating a standard intelligent platform management interface command to establish a SOL session between the serial port and a network interface controller (NIC) of the motherboard;

obtaining forward data stored in a storage system of the computing device, and transmitting the obtained forward data to the NIC through a predefined path, wherein the predefined path indicates that the obtained forward data is transmitted from the serial port to a baseboard management controller (BMC) of the motherboard, and then transmitted from the BMC to the NIC;

receiving the transmitted forward data from an interface of the NIC in a default interval;

determining whether the transmitted forward data is the same as the obtained forward data;

when the transmitted forward data is the same as the obtained forward data, obtaining backward data stored in the storage system, and transmitting the obtained backward data from the NIC to the serial port through a predefined reverse path, wherein the predefined reverse path indicates that the obtained backward data is transmitted from the NIC to the BMC, and then transmitted from the BMC to the serial port;

receiving the transmitted backward data from the serial port in the default interval;

determining whether the transmitted backward data is the same as the obtained backward data;

generating a prompt information that indicates the SOL function is normal when the transmitted backward data is the same as the obtained backward data; and generating a prompt information that indicates the SOL function is abnormal when the transmitted forward data is not the same as the obtained forward data or the transmitted backward data is not the same as the obtained backward data.

2. The method according to claim 1, wherein the obtained forward data is formatted by at least one processor of the computing device into a format suitable for transmission by the serial port.

3. The method according to claim 2, wherein the formatted forward data is transmitted to a north bridge chip of the motherboard, and then transmitted to the serial port.

4. The method according to claim 1, wherein the obtained backward data is formatted by at least one processor of the computing device into a format suitable for transmission by the NIC.

5. The method according to claim 4, wherein the formatted backward data is transmitted to a north bridge chip of the motherboard, and then transmitted to the NIC.

6. The method according to claim 1, wherein a performance of the motherboard determines a time for receiving the transmitted forward data and the transmitted backward data.

7. A computing device, comprising:
a motherboard;
a storage system;
at least one processor; and
one or more modules that are stored in the storage system and are executed by the at least one processor, the one or more modules comprising instructions to:
set a serial port of the motherboard to a serial over local area network (SOL) mode, and generate a standard intelligent platform management interface command to establish a SOL session between the serial port and a network interface controller (NIC) of the motherboard;
obtain forward data stored in the storage system, and transmit the obtained forward data to the NIC through a predefined path, wherein the predefined path indicates that the obtained forward data is transmitted from the serial port to a baseboard management controller (BMC) of the motherboard, and then transmitted from the BMC to the NIC;
receive the transmitted forward data from an interface of the NIC in a default interval;
determine whether the transmitted forward data is the same as the obtained forward data;
when the transmitted forward data is the same as the obtained forward data, obtain backward data stored in the storage system, and transmit the obtained backward data from the NIC to the serial port through a predefined reverse path, wherein the predefined reverse path indicates that the obtained backward data is transmitted from the NIC to the BMC, and then transmitted from the BMC to the serial port;
receive the transmitted backward data from the serial port in the default interval;
determine whether the transmitted backward data is the same as the obtained backward data;
generate a prompt information that indicates the SOL function is normal when the transmitted backward data is the same as the obtained backward data; and
generate a prompt information that indicates the SOL function is abnormal when the transmitted forward data is not the same as the obtained forward data or the transmitted backward data is not the same as the obtained backward data.

8. The computing device according to claim 7, wherein the obtained forward data is formatted by the at least one processor into a format suitable for transmission by the serial port.

9. The computing device according to claim 8, wherein the formatted forward data is transmitted to a north bridge chip of the motherboard, and then transmitted to the serial port.

10. The computing device according to claim 7, wherein the obtained backward data is formatted by the at least one processor into a format suitable for transmission by the NIC.

11. The computing device according to claim 10, wherein the formatted backward data is transmitted to a north bridge chip of the motherboard, and then transmitted to the NIC.

12. The computing device according to claim 7, wherein a performance of the motherboard determines a time for receiving the transmitted forward data and the transmitted backward data.

13. A non-transitory storage medium having stored thereon instructions that, when executed by a processor of a computing device, cause the computing device to perform a method for testing a serial over local area network (SOL) function of a motherboard of the computing device, the method comprising:
setting a serial port of the motherboard to a SOL mode, and generating a standard intelligent platform management interface command to establish a SOL session between the serial port and a network interface controller (NIC) of the motherboard;
obtaining forward data stored in a storage system of the computing device, and transmitting the obtained forward data to the NIC through a predefined path, wherein the predefined path indicates that the obtained forward data is transmitted from the serial port to a baseboard management controller (BMC) of the motherboard, and then transmitted from the BMC to the NIC;
receiving the transmitted forward data from an interface of the NIC in a default interval;
determining whether the transmitted forward data is the same as the obtained forward data;
when the transmitted forward data is the same as the obtained forward data, obtaining backward data stored in the storage system, and transmitting the obtained backward data from the NIC to the serial port through a predefined reverse path, wherein the predefined reverse path indicates that the obtained backward data is transmitted from the NIC to the BMC, and then transmitted from the BMC to the serial port;
receiving the transmitted backward data from the serial port in the default interval;
determining whether the transmitted backward data is the same as the obtained backward data;
generating a prompt information that indicates the SOL function is normal when the transmitted backward data is the same as the obtained backward data; and
generating a prompt information that indicates the SOL function is abnormal when the transmitted forward data is not the same as the obtained forward data or the transmitted backward data is not the same as the obtained backward data.

14. The non-transitory storage medium according to claim 13, wherein the obtained forward data is formatted by at least one processor of the computing device into a format suitable for transmission by the serial port.

15. The non-transitory storage medium according to claim 14, wherein the formatted forward data is transmitted to a north bridge chip of the motherboard, and then transmitted to the serial port.

16. The non-transitory storage medium according to claim 13, wherein the obtained backward data is formatted by at least one processor of the computing device into a format suitable for transmission by the NIC.

17. The non-transitory storage medium according to claim 16, wherein the formatted backward data is transmitted to a north bridge chip of the motherboard, and then transmitted to the NIC.

18. The non-transitory storage medium according to claim 13, wherein a performance of the motherboard determines a time for receiving the transmitted forward data and the transmitted backward data.

* * * * *